US008958969B2

(12) United States Patent
Christen et al.

(10) Patent No.: US 8,958,969 B2
(45) Date of Patent: Feb. 17, 2015

(54) METHOD AND DEVICE FOR OPERATING A MOTOR VEHICLE WITH AN INTERNAL COMBUSTION ENGINE IN A COASTING OPERATING MODE

(71) Applicant: Ford Global Technologies, LLC, Dearborn, MI (US)

(72) Inventors: Urs Christen, Aachen (DE); Andreas R. Schamel, Erftstadt-Kierdorf (DE); Goetz-Phillipp Wegner, Dortmund (DE); Uwe Gussen, Huertgenwald (DE)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 13/624,861

(22) Filed: Sep. 21, 2012

(65) Prior Publication Data

US 2013/0116906 A1    May 9, 2013

(30) Foreign Application Priority Data

Sep. 23, 2011  (DE) .......................... 10 2011 083 326
Sep. 23, 2011  (DE) .......................... 10 2011 083 332

(51) Int. Cl.

| | | |
|---|---|---|
| *B60T 8/32* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *G06G 7/70* | (2006.01) | |
| *G06F 7/70* | (2006.01) | |

(Continued)

(52) U.S. Cl.
CPC ........ *G05D 13/04* (2013.01); *B60K 2031/0091* (2013.01); *B60W 10/02* (2013.01); *B60W 2520/105* (2013.01); *B60W 10/06* (2013.01); *B60W 2520/10* (2013.01); *B60W 10/10* (2013.01); *B60W 2030/1809* (2013.01)

USPC ................................ 701/93; 701/110; 701/70

(58) Field of Classification Search
CPC .................... G05D 13/04; B60W 2030/18072; B60W 2520/10; B60W 10/02; B60W 10/06; B60W 10/10; B60W 2520/105; B60W 2031/0091; B60W 2030/1809; B60W 2030/18081; B60K 2031/0091
USPC ......................... 701/93, 110, 70; 477/181, 84
See application file for complete search history.

(56) References Cited

U.S. PATENT DOCUMENTS

| | | | | |
|---|---|---|---|---|
| 3,578,116 | A * | 5/1971 | Nakajima et al. | 477/90 |
| 5,794,170 | A * | 8/1998 | Kuroda et al. | 701/93 |
| 7,017,692 | B2 * | 3/2006 | Grassl et al. | 180/65.25 |
| 7,089,102 | B2 * | 8/2006 | Slayton et al. | 701/51 |

(Continued)

FOREIGN PATENT DOCUMENTS

| | | |
|---|---|---|
| WO | WO2005084995 | 9/2005 |
| WO | 2009152966 A2 | 12/2009 |

*Primary Examiner* — Calvin Cheung
*Assistant Examiner* — Paula L Schneider
(74) *Attorney, Agent, or Firm* — Carlson, Gaskey & Olds

(57) ABSTRACT

The invention relates to a method and a device for operating a motor vehicle with an internal combustion engine in a coasting operating mode in which the motor vehicle rolls essentially in a propulsionless fashion and essentially without a perceptible engine drag torque on an essentially level road if there is no propulsion request or braking request from a driver of the motor vehicle. According to the invention, the coasting operating mode is not brought about by automatically opening the drivetrain but rather is simulated with the clutch closed in that so much air/fuel mixture is fed to the internal combustion engine that the engine drag torque is largely but not completely compensated.

20 Claims, 1 Drawing Sheet

(51) Int. Cl.
*G06G 7/00* (2006.01)
*G06G 7/76* (2006.01)
*B60W 10/02* (2006.01)
*B60W 10/06* (2006.01)
*B60W 10/10* (2012.01)
*G05D 13/04* (2006.01)
*B60K 31/00* (2006.01)
*B60W 30/18* (2012.01)

(56) References Cited

U.S. PATENT DOCUMENTS

| | | | |
|---|---|---|---|
| 7,210,284 B2 * | 5/2007 | Odendall et al. | 60/285 |
| 8,494,737 B2 * | 7/2013 | Maier et al. | 701/65 |
| 2011/0231072 A1 * | 9/2011 | Roth et al. | 701/58 |
| 2012/0109476 A1 * | 5/2012 | Wiencek | 701/60 |
| 2012/0270701 A1 * | 10/2012 | Christen et al. | 477/171 |

* cited by examiner

METHOD AND DEVICE FOR OPERATING A MOTOR VEHICLE WITH AN INTERNAL COMBUSTION ENGINE IN A COASTING OPERATING MODE

CROSS-REFERENCE TO RELATED APPLICATIONS

This application is a continuation and claims the benefit of German Patent Application No. DE 102011083332.3 titled "Method and device for automatically activating or deactivating a coasting operating mode in a motor vehicle with an internal combustion engine" filed Sep. 23, 2011 and German Patent Application No. DE 102011083326.9 titled "Method and device for operating a motor vehicle with an internal combustion engine in a coasting operating mode" filed Sep. 23, 2011, which are both hereby incorporated by reference in their entirety.

TECHNICAL FIELD

The present disclosure relates to a method and a device for operating a motor vehicle with an internal combustion engine in a coasting operating mode in which the motor vehicle rolls in a propulsionless fashion and without a perceptible engine drag torque on a level road when there is no propulsion request or braking request from a driver of the motor vehicle.

BACKGROUND

A method and such a device are known from DE 10 2008 029 453 A1.

A conventional motor vehicle with an internal combustion engine becomes slower because of engine drag torque if a driver takes their foot off the accelerator pedal.

In motor vehicles with an internal combustion engine (ICE) and an automatic transmission there is what is referred to as a coasting operating mode in which the drivetrain is opened automatically, usually by opening a clutch when the driver takes their foot off the accelerator pedal. The internal combustion engine can also be entirely switched off in the coasting operating mode during idle or, for example, in the case of an automatic start/stop means. In the coasting operating mode, the engine drag torque is eliminated in order to save fuel.

Various driver interactions such as, for example, activation of the brake pedal, the accelerator pedal or the gear speed selector lever cause the drivetrain to close, i.e. causing the coasting operating mode to end and giving rise to non-coasting vehicle behaviour. With this general logic, the driver has control over the activation and/or deactivation of the coasting operating mode and the driver can choose between the coasting operating mode and rolling with engine drag torque.

The coasting operating mode makes it possible to save fuel because on an essentially level road because the motor vehicle can roll farther in a propulsionless fashion than a motor vehicle with a manual clutch under the influence of the engine drag torque. In particular the engine drag torque becomes even larger if in phases without a propulsion request. The supply of fuel is not maintained at the idling level but is instead completely switched off (in a state called overrun fuel cut-off). Furthermore, the coasting operating mode gives the driver a driving sensation.

SUMMARY

The disclosure makes it possible to benefit from the advantages of a coasting operating mode in a motor vehicle even if it is not possible for the drivetrain to open automatically. This feature is particularly desirable in a motor vehicle with a manual transmission and a manual clutch, but also desirable in a motor vehicle with an automatic transmission in which a coasting operating mode with automatic opening of the drivetrain is either not provided or not possible because there is no clutch which can be activated automatically, e.g., in some automatic transmissions with torque converter.

BRIEF DESCRIPTION OF THE DRAWINGS

A description of exemplary embodiments will be given below with reference to the drawings, in which.

DETAILED DESCRIPTION

Figure 1:
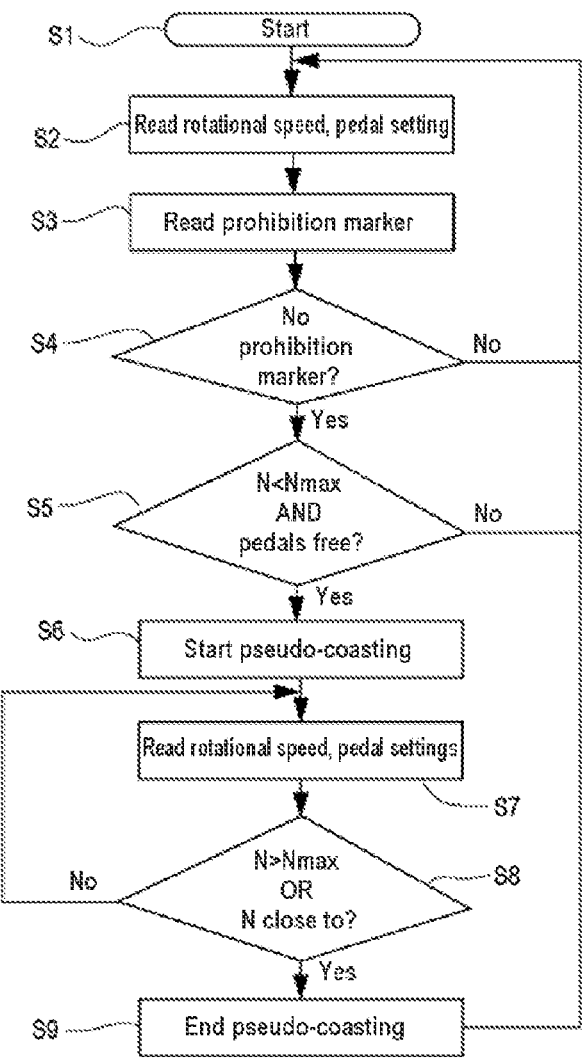
FIG. 1 shows a flow chart of the control strategy when a coasting operating mode of a motor vehicle with an internal combustion engine is being simulated.

A coasting operating mode is simulated with the clutch closed in that so much fuel/air mixture is fed to the internal combustion engine that the engine drag torque is largely but not completely compensated. As a result, the driver has virtually the same driving sensation as in a coasting operating mode of a motor vehicle with an automatic transmission, without having to open the clutch.

The engine drag torque is not completely eliminated (or compensated) but rather is only largely eliminated, for example 80%. This has two advantages: firstly this prevents possible rattling of the transmission and secondly in this way there is no risk of the motor vehicle accelerating during a coasting phase on an essentially level road.

If the method is carried out in a motor vehicle with the drivetrain which can be opened manually, in particular in a motor vehicle having a manual transmission and a manual clutch, the simulation of a coasting operating mode is preferably restricted to a certain rotational speed range where the lower limit is approximately the same as an idling speed or a little higher and the upper limit corresponds to a relatively high rotational speed. Engine speeds near to the idling speed can be used intentionally by the driver for slow driving, during which the driver requires a certain degree of propulsion and at higher engine speeds can be used by the driver to drive more slowly or at least avoid driving more quickly with the engine drag torque, for example on a road with a slope. If the specified rotational speed range is exited, the simulation of a coasting operating mode should be ended.

The rotational speed threshold value above which the simulation of a coasting operating mode is not started or ended, so that the motor vehicle experiences the entire engine drag torque, preferably corresponds approximately to an engine speed above which a gear speed change display indicates to the driver or—if such and indication is not provided—would indicate to the driver that the driver should shift to a higher transmission gear speed. As a result, the engine drag torque becomes effective when the driver normally expects it to and it can be used selectively when it is required.

In a motor vehicle with an automatic transmission and automatic clutch problems can be avoided by virtue of the fact that the gear speeds are also changed during a coasting phase in a way which is appropriate for the engine speed.

The invention is not restricted to motor vehicles with a manual transmission and a manual clutch is instead also suitable for a motor vehicle with an automatic transmission in which a coasting operating mode with automatic opening of the drivetrain is not provided. In this case it is not necessary to limit the rotational speed range for the simulation of the coasting operating mode in the upward direction because the transmission gear speeds are also adapted automatically during a coasting phase. It is appropriate, however, to prevent the coasting operating mode in a motor vehicle with an automatic transmission if the driver sets the selector lever for the driving mode to L (lowest gear speed) or M (manual) because in such a case the driver would probably like to use the entire engine drag torque, such as for example, when travelling downhill.

The simulation of a coasting operating mode is preferably ended if there is a propulsion request or braking request from the driver, for example by virtue of the fact that the driver activates the accelerator pedal or the brake pedal. The simulation of a coasting operating mode is preferably ended even when the road has a negative gradient above a negative gradient threshold value, which can be determined in various ways. When a coasting operating mode ends, an overrun fuel cut-off can also be activated, i.e. the supply of fuel is completely switched off in order to obtain the maximum engine drag torque.

The engine drag torque is, in particular, the sum of the current engine friction torque and the torque requests of all the assemblies in the motor vehicle which are driven mechanically by the internal combustion engine, in particular a dynamo and the compressor of a vehicle air-conditioning system.

The teachings of the present disclosure provide almost all the advantages of the conventional coasting with an opened clutch but without the expenditure on, for example, an electrically activated clutch and without the risk of an incorrect gear speed being engaged since in the drivetrain is not opened. Nevertheless, if the driver engages an incorrect gear speed there is no difference from conventional driving since the driver notices this immediately.

FIG. 1 shows a control routine which is run through repeatedly in an electronic engine control unit of a motor vehicle with an internal combustion engine, foot-activated clutch and manually shifted transmission. The routine is initialized whenever the motor vehicle is activated (at step S1). Whenever the routine is run through the current engine speed and the current settings of the accelerator pedal and the brake pedal are read by means of suitable sensors (at step S2) and the device checks whether some kind of coasting prohibition marker is set in the electronic engine control unit (steps S3, S4). If a coasting prohibition marker is set, the routine returns to step S2.

There are various conditions under which a coasting prohibition marker can be set, for example if there have been any abrupt pedal movements in a certain preceding time period or if a section of road with a slope is currently being travelled on. In a motor vehicle with an automatic transmission, a coasting prohibition marker can also be set if the driver has selected the L or M driving mode.

If no coasting prohibition marker is set, coasting is basically permitted and it is tested in step S5 whether the two conditions, according to which the engine speed N is lower than a threshold value, Nmax, and neither the accelerator pedal nor the brake pedal is depressed, are met. If the result of the testing in step S5 is no, the routine returns to step S2. If the result of the test in step S5 is yes, pseudo-coasting is started in step S6.

Pseudo-coasting is understood as meaning an operation of the motor vehicle in which, with the clutch closed, the motor vehicle rolls essentially in a propulsionless fashion and essentially without a perceptible engine drag, torque on an essentially level road in that so much fuel/air mixture is fed to the internal combustion engine that the engine drag torque is predominantly but not completely compensated, for example approximately 80% compensated.

Subsequent to step S6, in step S7 the current engine speed and the current settings of the accelerator pedal and of the brake pedal are read again, and in step S8 it is tested whether one of the three conditions is met: (1) the engine speed N being higher than the threshold value, Nmax; (2) the engine speed, N, being close to the idling speed, L; or (3) the accelerator pedal or the brake pedal being depressed. If the result of the test in step S8 is no, the routine returns to step S7. If the result of the test in step S8 is yes, in step S9 the pseudo-coasting is ended and the routine returns to step S2.

If the driver prevents the idling speed from being reached, by virtue of the fact that the driver shifts down, it is not necessary to end pseudo-coasting.

Figure 2:
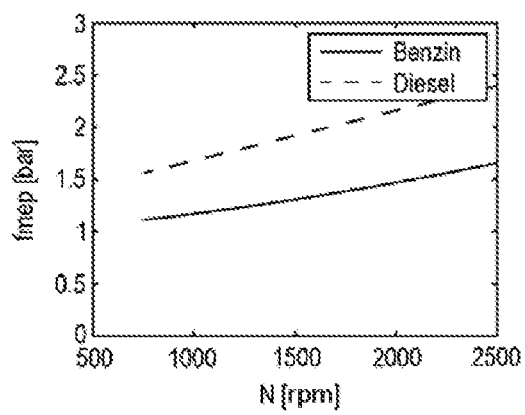
FIG. 2 shows a graph of the engine friction as a function of the rotational speed for petroleum and diesel engines.

The consumption of fuel by an unloaded internal combustion engine is only slightly higher if the internal combustion engine is operated with somewhat higher rotational speeds than the idling speed. This is apparent from FIG. 2 which shows that for a typical internal combustion engine the average working pressure fmep ("friction mean effective pressure") is necessary to overcome the engine friction, as a function of the engine speed. For this reason, the pseudo-coasting described above can be carried out without the fuel consumption rising overall since the motor vehicle can generally roll farther in the coasting phase than without the pseudo-coasting. The consumption of power during pseudo-coasting corresponds to the power necessary to overcome the engine friction plus the power which is required by auxiliary devices such as, for example, a dynamo and an air-conditioning compressor, which devices are driven mechanically by the internal combustion engine.

At relatively high rotational speeds, the engine balance is however not favourable because the pseudo-coasting is at any rate limited in a motor vehicle with a manual clutch and a manual transmission is limited to rotational speeds below the threshold value, Nmax. It is ergonomically expedient to set the threshold value, Nmax, to be equal to or approximately equal to the engine speed above which a gear speed change display on the dashboard indicates to the driver that the driver should shift into a higher gear speed.

The invention claimed is:

1. A method for operating a motor vehicle with an internal combustion engine (ICE) in a coasting operating mode in which the motor vehicle rolls in a propulsionless fashion, comprising: simulating the coasting operating mode by closing a clutch in a manner so that a predetermined air/fuel mixture is fed to the internal combustion engine thereby enabling an engine drag torque to be substantially compensated.

2. The method as claimed in claim 1, wherein simulating the coasting operating mode is started only at engine rotational speeds higher than an idling speed and lower than a threshold value.

3. The method as claimed in claim 2, further comprising: ending simulation of the coasting operating mode when an engine speed is lower than idling speed or is higher than the threshold value.

4. The method as claimed in claim 3, further comprising: activating an overrun fuel cutoff when the coasting operating simulation mode ends.

5. The method as claimed in claim 2, further comprising: ending simulation of the coasting operating mode when a propulsion request or braking request is detected.

6. The method as claimed in claim 2, further comprising:
ending simulation of the coasting operating mode when a negative road gradient above a negative gradient threshold value is detected.

7. The method as claimed in claim 1, wherein simulating the coasting operating mode is started only when the ICE is operating at an engine speed in which a transmission gear change is desired.

8. The method as claimed in claim 7, further comprising:
ending simulation of the coasting operating mode when a propulsion request or braking request is received.

9. The method as claimed in claim 7, further comprising:
ending simulation of the coasting operating mode when a negative road gradient above a negative gradient threshold value is detected.

10. The method as claimed in claim 7, further comprising:
activating an overrun fuel cutoff means when a coasting operating mode is ended.

11. The method as claimed in claim 1, further comprising:
calculating the engine drag torque to equal the sum of an engine friction torque and torque requests from assemblies in the vehicle driven mechanically by the internal combustion engine.

12. A device for operating a motor vehicle with an internal combustion engine (ICE) in a coasting operating mode, the device comprising:
an electronic engine control unit designed to simulate a coasting operating mode by closing a clutch in a manner so that a predetermined air/fuel mixture is fed to the ICE thereby enabling a predetermined engine drag torque to be compensated.

13. The device of claim 12, wherein the device is configured to start simulation of the coasting operating mode only when the ICE is operating at rotational speeds higher than an idling speed and lower than an upper threshold value.

14. The device of claim 12, wherein the device is configured to end simulation of the coasting operating mode when a propulsion request or braking request is detected.

15. The device of claim 12, wherein the device is configured to ending simulation of the coasting operating mode when a negative road gradient above a negative gradient threshold value is detected.

16. A method for operating a motor vehicle, comprising:
activating a coasting mode in an internal combustion engine (ICE) by closing a clutch in a manner so that a predetermined air/fuel mixture is fed to the ICE;
wherein the predetermined air/fuel mixture is configured to compensate for a predetermined engine drag torque.

17. The method of claim 16, further comprising:
calculating an engine drag torque to be equal to a sum of an engine friction torque and torque requests from assemblies in the vehicle driven mechanically by the internal combustion engine.

18. The method as claimed in claim 16, further comprising:
ending simulation of the coasting operating mode when a road gradient beyond a negative gradient threshold value is detected.

19. The method as claimed in claim 18, further comprising:
activating an overrun fuel cutoff means when the coasting operating mode is ended.

20. The method as claimed in claim 16, further comprising:
ending simulation of the coasting operating mode when a propulsion request or braking request is received.

* * * * *